US010757627B2

(12) United States Patent
Srinivasan et al.

(10) Patent No.: US 10,757,627 B2
(45) Date of Patent: Aug. 25, 2020

(54) SYSTEM AND METHOD FOR SEAMLESS SWITCHING BETWEEN OPERATOR NETWORKS

(71) Applicant: Alcatel Lucent, Boulogne Billancourt (FR)

(72) Inventors: Vikram Srinivasan, Bangalore (IN); Supratim Deb, Murray Hill, NJ (US); Kanthi Nagaraj, Bangalore (IN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 14/345,355

(22) PCT Filed: Sep. 17, 2012

(86) PCT No.: PCT/EP2012/068185
§ 371 (c)(1),
(2) Date: Mar. 17, 2014

(87) PCT Pub. No.: WO2013/037988
PCT Pub. Date: Mar. 21, 2013

(65) Prior Publication Data
US 2014/0342700 A1 Nov. 20, 2014

(30) Foreign Application Priority Data

Sep. 16, 2011 (IN) ............................ 3200/CHE/2011

(51) Int. Cl.
*H04M 1/66* (2006.01)
*H04M 1/68* (2006.01)
(Continued)

(52) U.S. Cl.
CPC ........... *H04W 36/18* (2013.01); *H04W 12/06* (2013.01); *H04W 36/0011* (2013.01);
(Continued)

(58) Field of Classification Search
CPC . H04W 36/14; H04W 12/06; H04W 36/0007; H04W 36/0011; H04W 36/0022;
(Continued)

(56) References Cited

U.S. PATENT DOCUMENTS 8,233,455 B2      7/2012 Shaheen et al.
8,909,695 B1 *   12/2014 Vendrow ................. H04L 51/36
                                                                      379/52
(Continued)

FOREIGN PATENT DOCUMENTS

CN           1588919        3/2005
CN         101374326        2/2009
(Continued)

OTHER PUBLICATIONS

Salgarelli L. et al: "Perimeter—User-Centric paradigm for Seamless Mobility in Future Internet—Architecture Specifications" May 24, 2011 (May 24, 2011).*
(Continued)

Primary Examiner — Joseph Arevalo
(74) Attorney, Agent, or Firm — Fay Sharpe LLP

(57) ABSTRACT

System and method for seamless switching between operator networks is disclosed. The present invention relates to communication networks and, more particularly, to switching between operators in communication networks. A network element termed as the service aggregator is provided that resides in the operator's network and acts as an intermediate between the mobile user and the operator. In addition, a switching module is provided on the mobile device of the user that interacts with the service aggregator to perform switching. Base station continuously broadcasts signaling information to the mobile device. Based on such signaling information received, the mobile device decides if it wishes to switch to another operator's network. The service aggre-
(Continued)

gator establishes connection with the service gateway of the new network. Further, service aggregator sends handover signal and the mobile device switches seamlessly to the new operator's network.

21 Claims, 6 Drawing Sheets

(51) Int. Cl.

| | | |
|---|---|---|
| H04M 3/16 | (2006.01) | |
| H04W 36/18 | (2009.01) | |
| H04W 48/18 | (2009.01) | |
| H04W 36/00 | (2009.01) | |
| H04W 12/06 | (2009.01) | |
| H04W 36/14 | (2009.01) | |
| H04W 88/06 | (2009.01) | |

(52) U.S. Cl.
CPC ........ *H04W 48/18* (2013.01); *H04W 36/0066* (2013.01); *H04W 36/14* (2013.01); *H04W 88/06* (2013.01)

(58) Field of Classification Search
CPC ......... H04W 36/0027; H04W 36/0033; H04W 36/0066; H04W 36/18
USPC .... 455/411, 436, 437, 456.1, 438, 431, 450, 455/419, 410, 406, 466, 414.1, 405, 435.2
See application file for complete search history.

(56) References Cited

U.S. PATENT DOCUMENTS

| | | | |
|---|---|---|---|
| 8,972,180 B1* | 3/2015 | Zhao | G01C 21/165 701/468 |
| 9,974,894 B2* | 5/2018 | Morello | A61M 1/1086 |
| 2008/0009267 A1* | 1/2008 | Ramos Robles | H04L 63/1425 455/411 |
| 2009/0016300 A1 | 1/2009 | Ahmavaara et al. | |
| 2009/0225725 A1* | 9/2009 | Zhu | H04W 36/0033 370/331 |
| 2010/0240370 A1 | 9/2010 | Pandit et al. | |
| 2011/0064050 A1* | 3/2011 | Livet | H04H 20/26 370/331 |
| 2013/0012211 A1* | 1/2013 | Sander | H04W 36/0022 455/438 |
| 2013/0039337 A1* | 2/2013 | Hwang | H04W 36/0066 370/331 |

FOREIGN PATENT DOCUMENTS

| | | |
|---|---|---|
| CN | 102083159 A | 6/2011 |
| JP | 2008-519568 | 6/2008 |
| JP | 2010-531116 | 9/2010 |

OTHER PUBLICATIONS

L Salgarelli et al., "Perimeter—User-Centric paradigm for Seamless Mobility in Future Internet—Architecture Specifications," Perimeter, pp. 1-100, XP055067051, May 2011.

International Search Report for PCT/EP2012/068185 dated Jun. 27, 2013.

Salgarelli, L., et al., "Perimeter—User-Centric paradigm for Seamless Mobility in Future Internet Architecture Specifications", [online], May 2011, URL:http://heanet.dl.sourceforge.net/project/perimeter/Documentation/Technical_Manual/TR-perimeter-arch-v4.pdf.

* cited by examiner

SYSTEM AND METHOD FOR SEAMLESS SWITCHING BETWEEN OPERATOR NETWORKS

TECHNICAL FIELD

The present invention relates to communication networks and, more particularly, to switching between operators in communication networks.

BACKGROUND

Mobile access networks are often designed as cellular networks that comprise of plurality of Base Stations (BS) connected together by means of switching nodes such as Base Station Controllers (BSC) and or Mobile Switching Centers (MSC). Further, each base station provides coverage over an area known as a cell. When a communicating mobile device moves out of the coverage area of such a cell the radio resources of that cell are no longer available for the mobile device. In such a scenario, the mobile device switches its connection to another cell whose resources are available for communication by means of handover or handoff. Another cell may belong to a different network operator who may have an agreement with the mobile device's present operator. The new operator may be providing services in areas where the service of the present operator are not available. This scenario is seen in roaming, wherein when a mobile device enters into another area where his network does not provide coverage then the mobile device is handed off to the new operator. This happens mainly because each network operator is provided certain limited radio frequency spectrum and when the mobile device moves out of the coverage provided by this spectrum switching becomes essential.

Further, with emerging trends in mobile data world, mobile data is exploding at a rapid rate. With increase in the mobile data the density of mobile traffic is also increasing. As a result, there may be a case wherein the user experience may not be favorable with a particular network X as the density of traffic on network X may be huge. The user may want to access a service that requires higher data rates such as video call, downloads and so on; in such a case the present network X cannot support service requirements of the user. Trying to access such a service with network X will result in poor user experience. As a result, a service model that can service the users based on his application/service requirements is the need of the hour.

In present day mechanisms switching between the networks happen only when one network is no longer available completely in that particular area of coverage. This means switching happens as per the choice of the network operator or the network conditions, and the mobile device is moved to another operator's network only after handover at the previous operator. There do not exist mechanisms in order to aggregator the network services available and intimate the user on his mobile device. The mobile device user may prefer to switch from one available network to another when desired by him. There may be several reasons for performing the switching. One of the reasons could be better coverage of one network over the other at some places, pricing and the like. For example, there may be a possibility where a user finds operator X's network to be better than operator Y's at a particular place. In such a case, if the user wants to use a better network for a service such as placing a video call and so on; existing systems have no means for the user to switch from network X to network Y. There is no flexibility provided to the user to switch between operators' of his choice based on the network condition and perform handover as per the mobile user's choice.

Further, dual-SIM phones have become extremely popular in the present day market. Due to this, the interesting trend is that users are demanding greater degree of choice in choosing their operators at one timescales. This allows users to switch between operators based on signal quality and price plans as per their requirements. In today's network deployment interesting aspect is that different operators deploy their networks to optimize different performance metrics. This means that depending on location and application requirements, the user choice of best operator could be different.

In addition, the requirements of static users are different from that of mobile users. For example, one cannot assume that the technique that works for static users will work for mobile users. Static users might wish to run a video streaming application over a Femto eNodeB, but on the other hand, a mobile user could experience better performance from a macro enodeB. As a result, the radio resource requirements may be different based on the type of user.

Due to aforementioned reasons it is evident that if users have choice, they can potentially reap the benefits of this diversity in operator deployments and enjoy a better user experience.

SUMMARY

In view of the foregoing, an embodiment herein provides a system for enabling users of mobile device to switch network operators on receiving broadcasted signaling information from plurality of base stations. The system comprises a service aggregator for aggregating services from plurality of network providers, further the aggregator configured for receiving handover initiation message from the mobile device when the mobile device decides to switch to a new operator's network, acquiring authentication and access to network resources in the new operator's network, establishing a tunnel to service gateway of the new network and sending a handover ready message over current operator's network. The mobile device configured for receiving aggregated service information from the service aggregator, decoding the service information to determine suitability of the new network for switching and sending the handover initiation message to the service aggregator for association with the new network. The system is configured for receiving the handover initiation message over a current network that the mobile device is connected to. The system is configured for performing switching for per application and for every interface chosen by the user of the mobile device. The service aggregator is configured for employing media independent pre authentication framework for acquiring the authentication. The service aggregator is configured for establishing tunnel to the service gateway of the new network operator for each application to be switched for the mobile device. The service aggregator is configured for forwarding duplicate packets on establishing tunnel to the service gateway of the new network operator. The mobile device receives the service information where the service information includes information on at least one of networks available, user experience, pricing details, load on the each network. The system is configured for enabling switching for at least one of static user, mobile user.

Embodiments further disclose a method for enabling users of mobile device to switch network operators on receiving broadcasted signaling information from plurality of base stations. The method comprises steps of decoding a service information obtained from a service aggregator by the mobile device to determine suitability of a new operator's network for switching, sending handover initiation message to the service aggregator when the mobile device decides to switch to a new operator's network, acquiring authentication and access to network resources by the service aggregator in the new operator's network, establishing a tunnel by the service aggregator to service gateway of the new network and sending a handover ready message by the service aggregator over current operator's network. Receiving handover initiation message happens over a current network that the mobile device is connected to. The switching is performed per application and for every interface chosen by the user of the mobile device. The service aggregator further comprising employing media independent pre authentication framework for acquiring the authentication. The service aggregator further establishes tunnel to the service gateway of the new network operator for each application to be switched for the mobile device. The service aggregator comprises forwarding duplicate packets on establishing tunnel to the service gateway of the new network operator. The service information includes information on at least one of networks available, user experience, pricing details, load on the each network. The method further enabling switching for at least one of static user, mobile user.

Embodiments herein also disclose a service aggregator for enabling users to switch network operators by aggregating services from plurality of network providers. The aggregator configured for receiving handover initiation message from a mobile device when user of the mobile device decides to switch to a new operator's network, acquiring authentication and access to network resources in the new operator's network, establishing a tunnel to service gateway of the new network and sending a handover ready message over current operator's network. The service aggregator is configured for receiving the handover initiation message over a current network that the mobile device is connected to. The service aggregator is configured for performing switching per application and for every interface chosen by the user of the mobile device. The service aggregator is configured for employing media independent pre authentication framework for acquiring the authentication. The service aggregator is configured for establishing tunnel to the service gateway of the new network operator for each application to be switched for the mobile device. The service aggregator is configured for forwarding duplicate packets on establishing tunnel to the service gateway of the new network operator. The service aggregator is configured for enabling switching for at least one of static user, mobile user. The service aggregator is configured for functionalities that include at least one of Authentication Authorization Accounting (AAA), tracking and paging and mobile IP.

Also, disclosed herein is a mobile device for enabling users to switch network operators, the mobile device provided with a switching module. The switching module is configured for receiving aggregated service information from a service aggregator, decoding the service information to determine suitability of the new network for switching and sending a handover initiation message to the service aggregator for association with the new network. The mobile device is configured for switching users, where the users are at least one of static users, mobile users. The mobile device is configured for decoding the service information where the service information includes information on at least one of networks available, user experience, pricing details, load on the each network. The mobile device is further provided with an association decision module for deciding applications and interfaces for which switching is to be performed.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
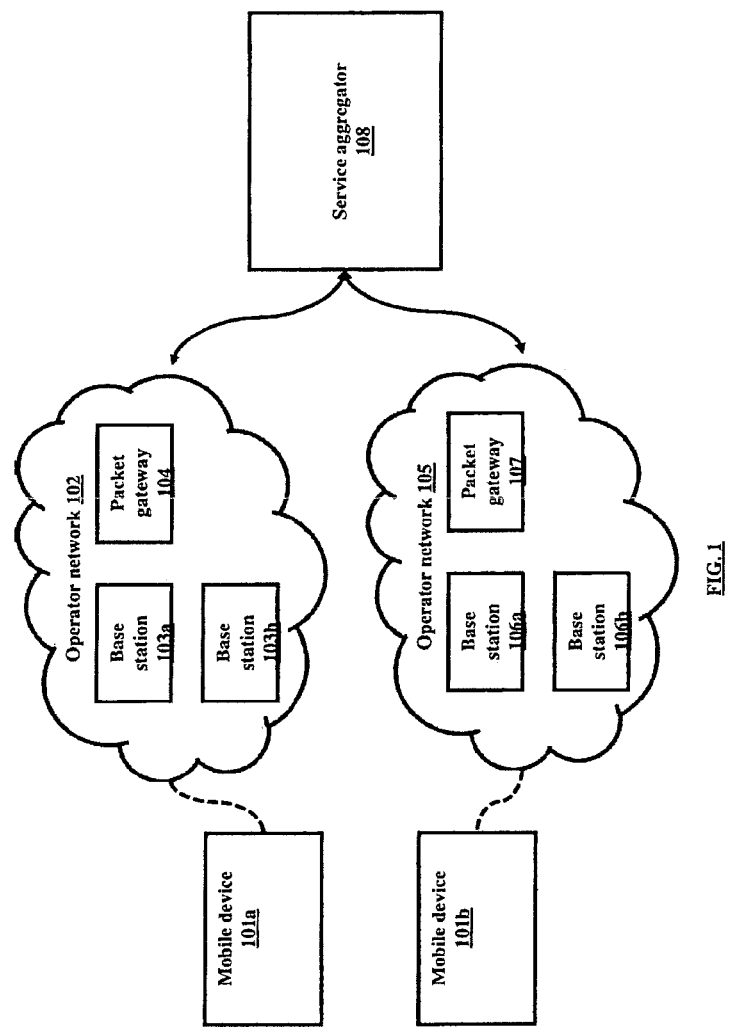
FIG. 1 illustrates the architecture of a mobile switching network, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a mechanism for switching between network operators by providing system and method thereof. Referring now to the drawings, and more particularly to FIGS. 1 through 6, where similar reference characters denote corresponding features consistently throughout the figures, there are shown embodiments.

A method for seamless switching between network operators in a mobile communication network is disclosed. The method is provided with system for performing the switching function. A network element termed as the service aggregator is provided. The service aggregator resides in the operator's network and acts as an intermediate between the mobile user and the operator. In addition, a switching module is provided on the mobile device of the user that interacts with the service aggregator to perform switching. Base station continuously broadcasts signaling information to the mobile device. The service aggregator aggregates the information on different network operators available and sends this service message to the mobile device. Based on such signaling and service information received, the mobile device decides if it wishes to switch to another operator's network. The mobile device then sends a switching request to the service aggregator. The service aggregator establishes connection with the service gateway of the new network.

Further, service aggregator sends handover signal and the mobile device switches seamlessly to a new operator's network.

FIG. 1 illustrates the architecture of a mobile switching network, according to an embodiment herein. The network may also be termed as Mobile Operator and Technology Agnostic Access (MOTA) service model. The MOTA network comprises of plurality of mobile devices 101a, 101b; two operator networks 102, 105; and a service aggregator 108. The operator network's 102, 105 further comprise of Base Station 103, 106 and packet gateway 104, 107. In an embodiment, the network depicts only essential elements for illustration purpose and does not aim to limit the scope of application to only these elements.

The mobile device 101a, 101b may comprise of a cell phone, Personal Digital Assistant (PDA), Voice over Internet Protocol (VOIP) phone and the like. The mobile device 101 may be static or may be in motion on a continuous basis. The mobile device 101 is provided with a switching module that resides within it. The switching module decodes the signaling information and interacts with the service aggregator 108. Further, the mobile device establishes connection with the new operator network on obtaining a signal from the service aggregator 108.

The operator network 102, 105 may be a network that is providing service to the mobile device 101 at present. In another embodiment, operator network 102, 105 may be a network to which the mobile device 101 prefers to switch. The operator network 102, comprises of the Base station 103a, 103b, 106a, 106b and packet gateway 104, 107. The base station 103a, 103b, 106a, 106b handles data traffic and signaling between the mobile device 101 and the network. The base station 103a, 103b, 106a, 106b broadcasts signaling information to the mobile device 101. The signaling information includes details such as load on the network, price information, user experience, user experience in the past and the like. This signaling information indicates to the user if the user will have a better experience on performing switching to another network. The packet gateway 104, 107 is responsible for sends signaling packets from the base station 103a, 103b, 106a, 106b to the mobile device 101. In case of IP based services the packets are sent to the packet gateway 104, 107 for performing decoding operations.

The service aggregator 108 is the core module of the MOTA network. The service aggregator 108 is mainly responsible for performing switching functions seamlessly. The service aggregator 108 interfaces between the mobile device 101 and the base station 103, 106. The service aggregator aggregates the information on different network operators available and sends this service message to the mobile device 101. When the mobile device 101 wants to switch to a new network the service aggregator 108 establishes connection with the new network. The service aggregator 108 authenticates with the new network and establishes connection with the service gateway of the new network. The service aggregator 108 then sends a handover signal and connects the mobile device 101 to the new network. In an embodiment, the service aggregator 108 also takes up functionalities such as authentication and billing, tracking and paging and various other mobile IP based service.

Figure 2:
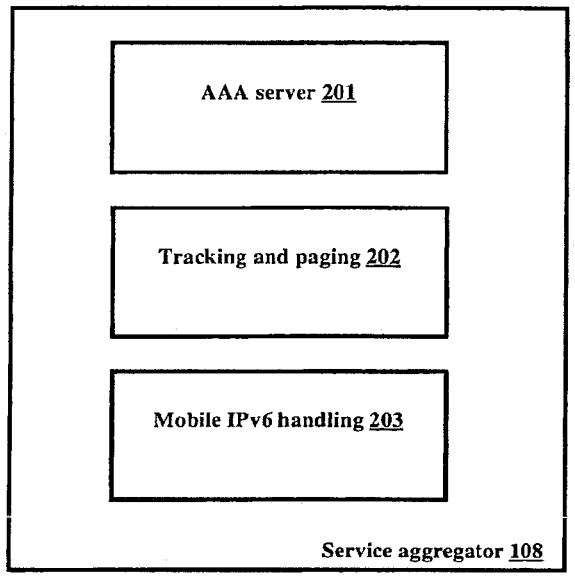
FIG. 2 illustrates a service aggregator, according to an embodiment herein.

FIG. 2 illustrates a service aggregator, according to an embodiment herein. The service aggregator 108 is the core component of the MOTA service model. The service aggregator 108 resides in between network operator 102, 105 and the mobile device 101. The service aggregator aggregates the information on different network operators available and sends this service message to the mobile device. In an embodiment, the service message may include details such as networks available, user experience on each network, load on the network and so on. The service aggregator 108 takes over some of the functionalities of the network operator such as authentication and billing, tracking and paging and various other mobile IP based service. The service aggregator 108 comprises of modules such as AAA server 201, tracking and paging 202 and mobile IPV6 handling module 203.

The AAA server 201 handles authentication, authorization and accounting functions. The AAA server 201 handles user requests for access to resources and, provides authentication, authorization, and accounting (AAA) services. The AAA server typically interacts with network access and gateway servers and with databases and directories containing user information. When the user prefers to perform switching of network the AAA server 201 authenticates with the service gateway of the new network operator and then performs switching.

Tracking and paging 202 module handles the tracking function of the mobile device 101 in cases where required. Paging is the one-to-one communication between the mobile device 101 and the base station. The most important use of broadcast information is to set up channels for paging. Every cellular system has a broadcast mechanism to distribute such information to a plurality of mobiles. However, in the current scenario the functionality is taken over by the tracking and paging module 202.

Mobile IPV6 handling module 203 handles the IP services of the mobile device 101 when users to move from one network to another while maintaining a permanent IP address. The Mobile IP protocol allows location independent routing of IP datagram's on the Internet. Each mobile node is identified by its home address disregarding its current location in the Internet. As a result, the mobile device 101 is provided seamless and continuous internet service even when it switches from one network operator to another.

Figure 3:
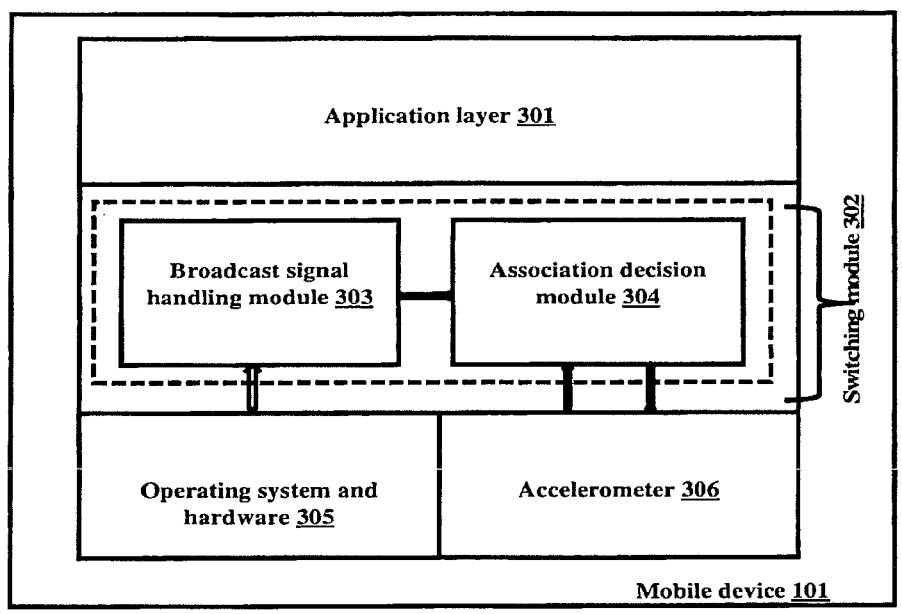
FIG. 3 illustrates a mobile device, according to an embodiment herein.

FIG. 3 illustrates a mobile device, according to an embodiment herein. The mobile device 101 comprises an additional switching module along with other modules that make up the mobile device 101. As depicted the mobile device 101 comprises application layer 301, switching module 302, operating system and hardware 305 and accelerometer 306. The switching module 302 is the core component that is responsible for performing switching of network operators. The switching module 302 further comprises broadcast signal handling module 303 and association decision module 304. In an embodiment, the mobile device is configured to understand IEEE 802.21 signaling information.

The application layer 301 facilitates communication with other network modules in order to provide services to mobile device users. The Mobile Application Part is the application-layer protocol used to access the Home Location Register, Visitor Location Register, Mobile Switching Center, Equipment Identity Register, Authentication Centre, Short message service center and Serving GPRS Support Node (SGSN). It is through the application layer 301 that different services such as calls, mobility services, operating and maintenance and supplementary services are provided to the mobile device.

The switching module 302 is responsible for decoding the signaling information received from the base station and sends commands for performing network switching. The switching module 302 interacts with the lower layers and accelerometer to make decisions. The switching module 302 further comprises a broadcast signaling module 303 and an association decision module 304. The broadcast signaling module 303 receives the signaling information from the base station and the service information from the service aggregator and decodes this information. The information is then sent to the association decision module 304. The association decision module 304 refers to the details stored in the signaling message. The details include pricing, user experience, traffic on that particular base station and the like. On determining these details it makes a decision as to switch to the new network operator or not. In an embodiment, the decision is dependent on the user's choice. On obtaining commands from the user, the association decision module 304 issues commands for switching.

The operating system and hardware 305 comprise of mobile device's operating system and other hardware modules involved. The accelerometer 306 is responsible for determining if the mobile device 101 is static or it is in motion. Based on this indication, the process of switching the network operator can be performed.

Figure 4:
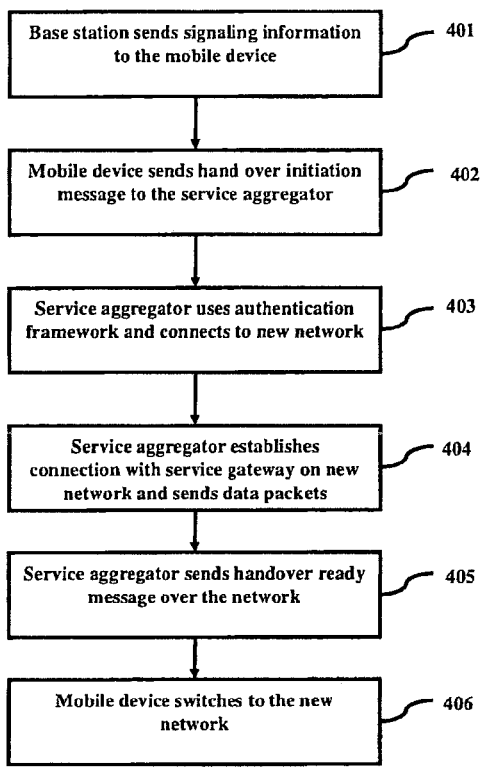
FIG. 4 is a flow diagram depicting the process of switching employing a service aggregator, according to an embodiment herein.

FIG. 4 is a flow diagram depicting the process of switching employing a service aggregator, according to an embodiment herein. In an embodiment, the key factor that has to be taken care during operator switching is seamless switching (i.e., make before break) and latencies due to authentication, connection establishment and network mobility (IP address change and so on). The Base stations continuously broadcast (401) the signaling information using the signaling messages proposed in IEEE 802.21 for IEEE and 3GPP standards. The mobile device 101 obtains the information and makes a switching decision. Let I be the set of interfaces that need to switch operators. Let A be the set of applications that are assigned a new operator, possibly by switching interface. The mobile device then sends (302) a handover initiation message to the service aggregator 108 over the current operator network. In an embodiment, the handover message may be in the form of IEEE 802.21 or the like.

Further, for each interface in I, the service aggregator uses (303) the IRTF's Media-Independent Pre-Authentication (MPA) framework to acquire authentication, IP address and network resources (e.g., reserve resources or bearer paths between the PGW and Service Gateway) in the new operator's network. Now for each application in A, the service aggregator 108 use mechanisms such as Fast Handover in MIPv6 to simultaneously establish (404) a tunnel to the service gateway of the new network and forwards duplicate packets. Once step 404 is completed for all the applications that are to be switched the service aggregator 108 sends (405) handover ready message for each interface I over the existing network. The mobile device 101 then switches (406) interfaces in I and the applications in A to the new network. The various actions in method 400 may be performed in the order presented, in a different order or simultaneously. Further, in some embodiments, some actions listed in FIG. 4s may be omitted.

Figure 5:
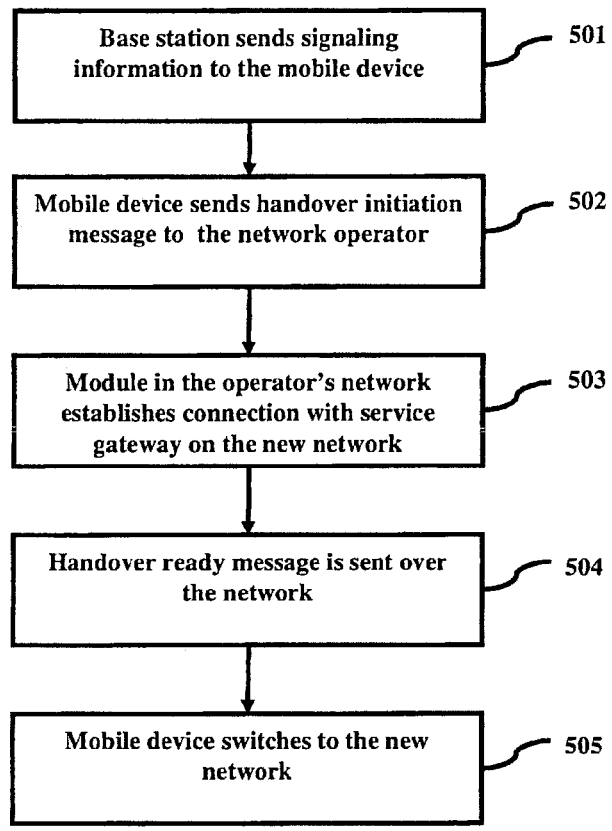
FIG. 5 is a flow diagram depicting an alternate process of switching without the service aggregator, according to an embodiment herein.

FIG. 5 is a flow diagram depicting an alternate process of switching without the service aggregator, according to an embodiment herein. The process described herein suggests an alternate embodiment to the service aggregator i.e., in this case there is no service aggregator and hence the functions of the service aggregator are performed by the network operator modules. The operator network in this case is configured in order to perform the switching as desired by the mobile device user. The base station broadcasts (501) signaling information continuously to the mobile device 101. The signaling information is sent through the network modules. If the mobile device 101 makes a decision to switch to another network operator the mobile device 101 sends (502) handover initiation message to the network operator. In an embodiment, the handover message may be in the form of IEEE 802.21 or the like. Further, for each interface in I, Media-Independent Pre-Authentication (MPA) framework is used (503) to acquire authentication, IP address and network resources (e.g., reserve resources or bearer paths between the PGW and Service Gateway) in the new operator's network. Now for each application in A, a connection is established with a tunnel to the service gateway of the new network and duplicate packets are forwarded. Once step 503 is completed for all the applications that are to be switched a handover ready message is sent (504) for each interface I over the existing network. The mobile device 101 then switches (505) interfaces in I and the applications in A to the new network. The various actions in method 500 may be performed in the order presented, in a different order or simultaneously. Further, in some embodiments, some actions listed in FIG. 5 may be omitted.

Figure 6:
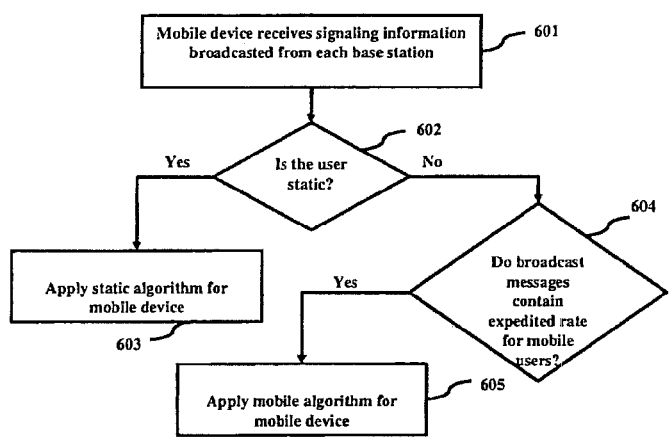
FIG. 6 is a flow diagram depicting the switching process for different users, according to an embodiment herein.

FIG. 6 is a flow diagram depicting the switching process for different users, according to an embodiment herein. In an embodiment, the method herein is capable of handling static and mobile users and addressing their service requirements accordingly. The mobile device 101 receives (601) signaling information broadcasted from each base station. The signaling information gives an indication of the pricing, user experience and the like. From the signaling information the switching module 302 on the mobile device 101 determines (602) if the user of the mobile device is static. If the user is static, then static algorithm for performing switching is applied (603) to the user. On the other hand, if the device is not indicated as static, then a check is made (604) if the broadcasted messages contain expedited rate for mobile users. In addition, the accelerometer on the mobile device also helps in determine if the users are in motion. If yes, then algorithm for mobile users is applied and switching is performed accordingly. The various actions in method 600 may be performed in the order presented, in a different order or simultaneously. Further, in some embodiments, some actions listed in FIG. 6 may be omitted.

In an embodiment, the following symbols are used to represent the algorithm.

TABLE 1

List of symbols used

| Symbol | Description |
| --- | --- |
| $\mathcal{L}, l$ | Set of technologies and index for a |
| $(l \in \mathcal{L})$ | typical technology, respectively |
| $\mathcal{J}, j$ | Set of base-stations and index for a |
| $(j \in \mathcal{J})$ | typical base-station, respectively |
| $\mathcal{J}_l$ | Set of base-stations offering technology-l |
| $P_j$ | Price (per unit time per unit weight) charged by base-station-j |
| $\mathcal{J}_l^o$ | Set of base-stations of operator o offering technology-l |
| $\mathcal{A}, a$ | Set of all applications and index for a |
| $(a \in \mathcal{A})$ | typical application, respectively |
| $\mathcal{A}_u$ | Set of applications of user-u |
| $r_{uj}$ | PHY-layer data rate between user-u and base-station j |
| $R_a$ | Throughput achieved by application a |
| $w_a$ | Weight of application a (for service differentiation) |
| $B_a$ | Duration of application a |

The Network Signaling for static users indicates that for each base station j transmits the load Wj and the price Pj. For any user-u, the association problem can be stated as follows: associate each application to a suitable base-station, subject to integral association and single operator per technology constraint, such that we maximize Pa2AuU(Ra; pa). Note that choosing one base station for an interface is equivalent to choosing the operator for that interface, since each base station is associated with one operator. A naive brute force approach for solving the above could be computationally heavy for the following. Assume that user u has K radio interfaces, J base station choices per interface and Au applications that he is running. Then the complexity of a brute force approach is O(KAu+J). Therefore even if the user runs only a few applications, the complexity of figuring out the optimal association can blow up. In fact, this problem is NP-hard5. Therefore we devise an algorithm with a constant factor approximation guarantee. In the scheme, each base-station broadcasts its current weight, based on which the user performs the association. Using Fact 1, the throughput of application-a can be expressed as $$R_a = \sum_j \frac{x_{aj} w_a r_{uj}}{W_j + \sum_{a \in A_u} x_{aj} w_a}$$

This is because, the association u's applications to base station-j increases its current weight to $W_j + \sum_{\alpha \in A_u} x_{\alpha j} w_\alpha$. Clearly, only one of the 0-1 association variables $x_{aj}$'s can take value one, i.e., $\Sigma_j x_{\alpha j} = 1$.

Using the above expression for Ra, we now note that $$\sum_{a \in A_u} U(R_a, p_a) = \sum_{a \in A_u} w_a \left[ \ln\left( \sum_j \frac{x_{aj} w_a r_{uj}}{W_j + \sum_{a \in A_u} x_{aj} w_a} \right) - \lambda_u \sum_j x_{aj} P_j \right] =$$

$$\sum_{a \in A_u} w_a \ln\left( \sum_j \frac{x_{aj} r_{uj} e^{-\lambda_u P_j}}{W_j + \sum_{a \in A_u} x_{aj} w_a} \right) + \sum_{a \in A_u} w_a \ln w_a$$

Since the second quantity in the above is devoid of optimization variables $x_{aj}$'s, maximizing $\Sigma_{\alpha \in A_u} U(R_\alpha, p_\alpha)$ is equivalent to maximizing $$V(\{x_{aj}: a \in A_u, j \in \mathcal{J}\}) = \sum_{a \in A_u} w_a \ln\left( \sum_j \frac{x_{aj} s_j}{W_j + \sum_{a \in A_u} x_{aj} w_a} \right)$$

where, $$s_j \triangleq r_{uj} e^{-\lambda_u P_j}$$

Although sj depends on both u and j, we have hidden the dependence of sj on u since we are interested u's decisions. In the following, we will describe an algorithm to find $x_{aj}$'s that maximize the expression given by (5).

Our algorithm builds on the observation that, if we knew the total weight of all applications associated with a particular radio interface, then, it is simple for the radio interface to determine the best base station for that interface. We then use this observation and run a greedy algorithm to select an operator for each radio interface, and select an interface for each application. Sub-routine for base station selection for a technology: Suppose w is the total weight of all applications of user u that gets associated to base station j, i.e $w = \Sigma_\alpha x_{\alpha j} w_\alpha$ Then, it is easy to see from (5), that the total contribution of base station j to $V(\{x_{\alpha j}: \alpha \in A_u, j \in \mathcal{J}\})$ is given by:

$$w \ln\left( \frac{s_j}{W_j + w} \right)$$

However, we have a constraint that states that only one base station can be selected from a technology. From the preceding we can see that, this selection depends on the total weight w, of all applications of user u that we associate with the technology. In particular, for technology I, the best base station would be given by $$j_I^*(w) = \arg\max_{j \in \mathcal{J}_I} \ln\left( \frac{s_j}{W_j + w} \right)$$

In an embodiment, the static algorithm is as below:

Algorithm 1 MOTA-STATIC: Assignment of applications to radio interfaces and operators to interfaces.

1: Initialization: Order the weights of the applications of user u as $w_a$, i = 1, 2, . . . , n, where $w_1 \le w_1 \le w_2 \le w_3 \le$ . . . .
Let $\Delta_l$ be the total weight of all application associated with interface l. Set $\Delta_l = 0$, $\forall l$.
2: for r = 1, . . . , n do
3: Assign application r with weight $w_r$ as follows $l_r$ = arg max$_l$ [$(\Delta_l + w_r)G_l(\Delta_l + w_r) - \Delta_l G_l(\Delta_l)$]
4: $\Delta_{l_r} = \Delta_{l_r} + w_r$
5: end for
6: Return $j_l^*(\Delta_l)$ for all l Here we have explicitly shown that dependence of $j^*_I(w)$ on w, the total weight of all applications of user u that Is associated with technology I. To this end, for each technology I, we define the function $G_I(w)$ as $$G_I(w) \triangleq \max_{j \in \mathcal{J}} \ln\left( \frac{s_j}{W_j + w} \right).$$

This sub-routine thus computes the function $G_I(w)$ for a given w and also the corresponding best base station $j^*I(w)$.

Greedy application association: The MOTA-Static algorithm is described in Algorithm 1. In the initialization step 1, we first order the applications of user u in increasing order. Further, we define a quantity ΔI, the total weight of all application assigned to interface I and initialize this to zero. Next we iterate through each application in increasing order of weight. Step 3 is the greedy step where we determine the interface Ir that application r should be assigned to that results in the maximum increase in utility over the current allocation of the first r–1 applications. Step 4 merely updates the total weight of the appropriate interface. Once all the applications are assigned interfaces, we use equation (6) to determine the best base station for each interface.

In an embodiment, the algorithm for mobile users is as below.

Algorithm 2 MOTA-MOBILE: Assignment of applications of user u to radio interfaces and base-stations (operators) to interfaces.

1: Initialization: Assign every application to as random interface and pick a random base station for every interface. Let $S_{lj}$ to be the set of applications of user u that get associated to operator j. Let v(a) be the marginal utility of the application -continued Algorithm 2 MOTA-MOBILE: Assignment of applications of
user u to radio interfaces and base-stations (operators) to
interfaces.

a. The 0-1 variable $x_{aj} = 1$ iff application a is associated to
base station j, and, the 0-1 variable $z_{al} = 1$ iff application a
is associated to some base station of technology l.

2:    for $L \ln \frac{1}{e}$ iterations do

3:      for $l \in \mathcal{L}$ do
4:        for $l \in \mathcal{J}_i$ do
5:          Construct $S_{l,j}$ and compute $\Delta_{l,j}$ as follows:
$$S_{l,j} = \{a : \text{either } z_{al} = 1 \text{ or } \delta_{lja} > 0\},$$

$$\Delta_{lj} = \sum_{a \in S_{l,j}} \delta_{aij}$$

6:      end for
7:      Compute $$\Delta_l^* = \max_{j \in \mathcal{J}_l} \Delta_{lj}, \quad j^*(l) = \arg\max_{j \in \mathcal{J}_l} \Delta_{lj}$$

8:      end for

9:    $l_{best} = \arg\max_{l \in \mathcal{L}} \Delta_l^*.$

10:    For all $a \in S_{l_{best}, j(l_{best})}$, set
        $x_{aj^*(l_{best})} \leftarrow 1$, $v(a) \leftarrow U_{j^*(l_{best})}(a)$,
        and update $z_{al}$'s appropriately.
11:    end for
12:    Return the assocation decisions.

In the mobile case, once a switching decision is made, the utility received by an application is not only a random variable, but it also varies as a mobile user is handed-off from the current cell (the cell where an association decision is made) to another cell of the operator. The identity and the state (load) of the next cells on the user mobility path are random variables from the point of view of the user module that makes the association decisions. Thus, we maximize $\Sigma_\alpha E[\overline{U(R_\alpha, p_\alpha)}]$ Where $\overline{U(R_\alpha, p_\alpha)}$ denotes the time-average utility for application-a.

We now turn to the problem of how a user determines the following: (i) which set of applications to associate with each technology and (ii) which base-station to select for each technology. These are obviously coupled problems. Note that, each base station corresponds to an operator and so, by choosing one base station for a technology interface we are essentially choosing one operator for the technology interface. Consider a user u who wishes to perform the optimal association. Let $U_j(a)$ be the expected utility that application a achieves if user u associates application a to base-station j (of some operator). In the previous subsection, we described how $U_j(a)$ can be computed based on base-station signaling. Suppose $x_{aj}$ is the 0-1 variable that is set to one if a is associated to base-station j.

Then, our goal is to maximize $\Sigma_{\alpha \in A_u} \Sigma_j x_{\alpha j} U_j(\alpha)$ Subject to the constraint that only one operator can be chosen from a technology. Note that, this problem is different from the static case for the following reason. In the static case, if multiple applications were associated to one base-station, they would get utility proportional to their weight. We exploited this structure to derive Algorithm MOTA-Static in the static case. Unfortunately, there is no such structure in this mobile case as the expected utility of an application has complex dependence on its duration and the cells it is handed-off to subsequently. Nevertheless, the problem in mobile case of maximizing $\Sigma_{\alpha \in A_u} \Sigma_j x_{\alpha j} U_j(\alpha)$ is similar to the problem of maximum generalized assignment problem (GAP) [22] of assigning balls (applications) to bins (technologies). The main difference in our problem is that we have no constraints on the set of items (in these applications) that can be assigned to an interface. Further there is an additional element of having to choose an operator for each interface. We make suitable modifications to the local search algorithm.

Initialization (Step 1): First, all interfaces chose an arbitrary operator and each application chooses the interface whose choice of operator provides best expected uti8lity. Local search iteration (Step 2-11): For each application a, let v(a) be the current utility in an iterative step. Recall that xaj is the 0-1 variable that takes value one if a is associated to base station j through a suitable interface. A subset of the xaj's are updated after each iteration. For convenience, also define the variable zal as the 0-1 variable that is one if application a Is associated to some base-station offering technology I (i.e., zal=1 if for some j 2 JI, xaj=1). Given an association from the previous iteration, we define the marginal utility of the application a if it were assigned to interface I and operator j over its current allocation as follows for all j 2 JI:

$$\delta_{lja} = \begin{cases} U_j(a) - v(a), & \text{if, } z_{al} = 0, \\ U_j(a), & \text{if, } z_{al} = 1 \end{cases}$$

For all I; construct the sets SI:j as follows:
$S_{l,j} = \{\alpha: \text{either } z_{al}=1 \text{ or } \delta_{lja}>0\}.$ Let $\Delta_{lj} \Sigma_{\alpha \in S_{l,j}} \delta_{lja}$. Here $\Delta_{lj}$ denotes the increase in utility if some applications are re-associated to base station j of technology interface I from some other interface. Let $\Delta_l^* = \max_{j \in J_l} \Delta_{lj}$ and $j^*(l) = \arg\max_{j \in J_l} \Delta_{lj}$.

Base station j_(I) is the best base station of technology I for maximizing marginal utility in this iteration. Each iteration of local search is now easy to describe: based on the association from the previous iteration, obtain the technology interface lbest with maximum $\Delta_l^*$ and, on that interface update xaj for j*(Ibest) and also update v(a).

An example embodiment of the application is described herein. Consider a mobile gadget has 3 radio interfaces: 1 for LTE, 1 for 3G, and 1 for Wi-Fi. The applications running include video streaming. Now we will describe a scenario of what happens when new applications start. Operators; Operator-1 and Operator-2 with both offering 3G and LTE. Wi-Fi belongs to the user's home. Assumption: Video streaming being a high QoS service has weight 4, VoIP has weight 2, file download has weight=1.

Steps: 1. Initial association: Each operator broadcasts total weight of the nearest LTE eNodeB and also for 3G. Now suppose user starts a video streaming application. This information is used by user gadget to choose suitable technology or operator. Suppose our middleware chooses Wi-Fi access point based on MOTA-STATIC.

2. New applications: Now suppose user starts a file download. Our middleware immediately associates the file download with 3G. Next moment, the user decides to make a VoIP call which MOTA-static decides to route through 3G of Operator-2.

3. Mobility: The VoIP call ends and user steps out of her home in a bus while the video streaming and file download is running. Our middleware detects (by interacting with the accelerometer) that the user is mobile and performs a re-association by calling the MOTA-MOBILE algorithm, which results in Video Streaming application getting associated to LTE of Operator-1 while the file download continues on 3G of Operator-2. This ensures that, each application uses the right interface and right operator.

The embodiments disclosed herein can be implemented through at least one software program running on at least one hardware device and performing network management functions to control the network elements. The network elements shown in FIGS. 1, 2 and 3 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A system for enabling users of mobile device to switch network operators on receiving broadcasted signaling information from plurality of base stations, said system comprising:
   a service aggregator configured to aggregate service information from a plurality of network providers, wherein said service aggregator is configured to:
      receive handover initiation message from said mobile device when said mobile device decides to switch to a new operator's network;
      acquire authentication and access to network resources in said new operator's network;
      establish a tunnel to service gateway of said new network; and
      send a handover ready message over current operator's network, said handover ready message including aggregated service information;
   said mobile device comprising an accelerometer, the accelerometer being configured to determine if said mobile device is static or in motion, and a switching module, the switching module being configured to
      receive said aggregated service information from said service aggregator;
      decode said service information to determine suitability of said new network for switching;
      interacting with the accelerometer to determine an indication if said mobile device is static or in motion; and
      based on said indication, send said handover initiation message to said service aggregator for association with said new network.

2. The system as in claim 1, wherein said system is configured to receive said handover initiation message over a current network that said mobile device is connected to.

3. The system as in claim 1, wherein said system is configured to perform switching per application and for interfaces chosen by said user of said mobile device.

4. The system as in claim 1, wherein said service aggregator is configured to employ a media independent pre authentication framework to acquire said authentication.

5. The system as in claim 1, wherein said service aggregator is configured to establish tunnel to said service gateway of said new network operator for applications to be switched for said mobile device.

6. The system as in claim 1, wherein said service aggregator is configured to forward duplicate packets on establishing tunnel to said service gateway of said new network operator.

7. The system as in claim 1, wherein said mobile device receives said service information, wherein said service information includes information on at least one of networks available, user experience, pricing details, load on the networks.

8. The system as in claim 1, wherein said system is configured to enable switching for at least one of a static user or a mobile user.

9. A method for enabling users of mobile device to switch network operators on receiving broadcasted signaling information from plurality of base stations, said method comprising:
   receiving, by said mobile device, aggregated service information from a service aggregator that aggregates service information from a plurality of network providers;
   decoding, by said mobile device, said service information received from said service aggregator to determine suitability of a new operator's network for switching;
   determining, by said mobile device interacting with an accelerometer in said mobile device, an indication if said mobile device is static or in motion, and, based on said indication, sending a handover initiation message to said service aggregator when said mobile device decides to switch to a new operator's network;
   acquiring authentication and access to network resources by said service aggregator in said new operator's network;
   establishing a tunnel by said service aggregator to service gateway of said new operator's network; and
   sending a handover ready message by said service aggregator over current operator's network, said handover ready message including aggregated service information.

10. The method as in claim 9, wherein said receiving handover initiation message happens over a current network that said mobile device is connected to.

11. The method as in claim 9, wherein said switching is performed per application and for interfaces chosen by said user of said mobile device.

12. The method as in claim 9, wherein said service aggregator employs a media independent pre authentication framework configured to acquire said authentication.

13. The method as in claim 9, wherein said service aggregator establishes a tunnel to said service gateway of said new network operator for applications to be switched for said mobile device.

14. The method as in claim 13, wherein said service aggregator forwards duplicate packets on establishing said tunnel to said service gateway of said new network operator.

15. The method as in claim 9, wherein said service information includes information on at least one of networks available, user experience, pricing details, load on the networks.

16. The method as in claim 9, wherein said method further enabling switching for at least one of a static user and a mobile user.

17. A service aggregator for enabling users to switch network operators by aggregating service information from a plurality of network providers, said aggregator configured to:
- send aggregated service information from a plurality of network providers to said mobile device for determining suitability of a new operator's network for switching;
- receive handover initiation message from a mobile device when user of said mobile device decides to switch to a new operator's network;
- acquire authentication and access to network resources in said new operator's network;
- establish a tunnel to a service gateway of said new network operator for the applications to be switched for said mobile device; and
- send a handover ready message over current operator's network, wherein said aggregator is configured to enable switching of at least one static user or mobile user, and wherein said aggregator is configured to provide functionalities that include at least one of Authentication Authorization Accounting (AAA), tracking and paging and mobile IP.

18. The service aggregator as in claim 17, wherein said aggregator is configured to receive said handover initiation message over a current network that said mobile device is connected to.

19. The service aggregator as in claim 17, wherein said aggregator is configured to perform switching per application and for interfaces chosen by said user of said mobile device.

20. The service aggregator as in claim 17, wherein said aggregator is configured to employ media independent pre authentication framework for acquiring said authentication.

21. The service aggregator as in claim 17, wherein said aggregator is configured to forward duplicate packets on establishing tunnel to said service gateway of said new network operator.

* * * * *